United States Patent [19]
Harris et al.

[11] Patent Number: 5,849,940
[45] Date of Patent: Dec. 15, 1998

[54] TRIGLYCERIDE FRACTIONATION

[75] Inventors: John Bernard Harris, Sharnbrook; Stephen Raymond Moore, Thrapston; Christopher Rawlings, Rushden, all of United Kingdom

[73] Assignee: Loders-Croklaan B.V., Wormerveer, Netherlands

[21] Appl. No.: 926,994

[22] PCT Filed: Oct. 8, 1993

[86] PCT No.: PCT/EP93/02776

§ 371 Date: Jun. 19, 1995

§ 102(e) Date: Jun. 19, 1995

[87] PCT Pub. No.: WO94/09098

PCT Pub. Date: Apr. 28, 1994

Related U.S. Application Data

[63] Continuation of Ser. No. 416,856, Jun. 19, 1995, abandoned.

[30] Foreign Application Priority Data

Oct. 16, 1992 [EP] European Pat. Off. .............. 92309489

[51] Int. Cl.⁶ ................. C11B 3/12; C11B 7/00
[52] U.S. Cl. ............ 554/206; 554/208; 554/211; 554/213; 426/417
[58] Field of Search ................... 554/206, 208, 554/211, 212; 426/417

[56] References Cited

U.S. PATENT DOCUMENTS 3,492,130  1/1970  Harwood .................................. 99/118

FOREIGN PATENT DOCUMENTS

| 0 081 881 | 6/1983 | European Pat. Off. . |
| 81881 | 6/1983 | European Pat. Off. . |
| 0 189 669 | 8/1986 | European Pat. Off. . |
| 2303072 | 10/1976 | France . |
| 83 00418 | 2/1983 | WIPO . |

*Primary Examiner*—Samuel Barts
*Assistant Examiner*—Deborah D. Carr
*Attorney, Agent, or Firm*—Pillsbury Madison & Sutro LLP

[57] ABSTRACT

The invention concerns a fractionation process for the production of triglycerides with at least 12 wt % SSU (S=saturated fatty acids; U=unsaturated fatty acids) by subjecting a fat with at least 5 wt % SSU to a fractionation, achieving an enrichment factor fo the SSU enrichment of at least 1.5

10 Claims, No Drawings

TRIGLYCERIDE FRACTIONATION

This is a continuation of application Ser. No. 08/416,856, filed on Jun. 19, 1995, which was abandoned upon the filing hereof which is a 371 of PCT/EP93/02776 filed on Oct. 8, 1993.

BACKGROUND OF THE INVENTION

In British patent application 9121578.0 we have disclosed non-temper confectionery fats, containing minimal working amounts of fat of the SSO-type. These fat compositions are obtained by adding externally the working amount of SSO.

Above method has, however, the disadvantage that we must have free access to SSO-type triglycerides. Although several methods are known by which these fats can be synthesized, it would offer a main advantage when triglyceride mixtures could be obtained along non-synthetic routes, e.g. by applying fractionation techniques only, that contain enough of the SSO component to make them suitable as additive for polymorphic fats that otherwise needed tempering. Even more advantages could be achieved when fat mixtures could be obtained that do not need to be tempered anymore, because of the presence of enough of the SSO triglycerides.

SUMMARY OF THE INVENTION

In fact, our invention concerns with a process that results in the production of the desired fat mixtures. Therefore, our invention concerns a process for preparing a fat fraction, suitable as fat component in non-lauric, non-hydrogenated, cool melting, non-temper, non-trans filling or coating fats. This process is characterized by: performing a fractionation on a triglyceride composition, containing at least 5 wt % SSU triglycerides (S=$C_{16}$–$C_{22}$ saturated fatty acid, preferably $C_{16}$–$C_{18}$; U=mono- or poly-unsaturated $C_{18}$–$C_{22}$ fatty acid; preferably oleic acid), removing at least part of the trisaturated triglycerides and/or at least part of the di- and tri-unsaturated triglycerides and isolating a triglyceride composition with an SSU content of at least 12 wt %, preferably 12–20 wt %, which content is at least 1.5 times, preferably at least 1.7 times, most preferably at least 2.0 times the SSU content of the starting triglycerides composition.

Simultaneously, the SUS content of the products isolated should be at least 65 wt %, preferably at least 70 wt %.

DETAILED DESCRIPTION OF THE INVENTION

The starting triglyceride, preferably contains at least 6 wt % of the SSU triglycerides. As the endproducts are meant to be used as confectionery fats, the starting fats are also rich in SUS-triglycerides. Suitable fats, meeting above criteria are: palm oil, palm oil fractions, mixtures thereof, in particular palm oil stearin, and more particularly a palm oil stearin, obtained after dry fractionation. Very useful results can be obtained by using mixtures of palm oil and dry fractionated palm oil stearin, in particular mixtures with more than 20 wt % of the stearin.

From EP 81 881 a process is known, wherein a palm oil stearin is subjected to a solvent fractionation. Three fractions are obtained, i.e. a first fraction with a melting point above 45° C., a second fraction with a melting point between 33° and 44° C. and a third, liquid fraction. The fractionation is performed by mixing 1–6 l of solvent per gram of fat at 50° C.; cooling the solution obtained to 12°–14° C., collecting the precipitate formed; extracting said precipitate under specific conditions with solvent of 10° C.; filtering the slurry from the extraction step, resulting in the high melting product and a filtrate; the filtrate is cooled to 1°–3° C. and the new precipitate is collected; this new precipitate is extracted again under very specific conditions; after filtering of the slurry of this second extraction the intermediate melting product is separated, the filtrate also obtained is subjected to a removal of the solvent giving the liquid oil. According to page 9, lines 22–42 the extraction steps are incomparable with washing steps and have main advantages over a washing. Nothing is disclosed about the SSU-content of the starting palm oil stearin, the SSU content of the end products, enrichment in the SSU content or the production of non-temper confectionery fats. In our process we do not apply the very specific extraction (=non-washing) steps, as prescribed by the above EP 81 881.

Wet fractionations of palm oil-based materials are known from a.o. DE 2,921,499; DE 1,792,606; U.S. Pat No. 3,686,240; U.S. Pat. No. 4,055,679; EP 347,006 or EP 78,568. However, in none of these references it is mentioned that the product obtained has an SSU-content of at least 12 wt %, while an enrichment with a factor 1.5 for the SSU-content is achieved.

The fractionation can be carried out as dry fractionation, or as wet fractionation, while also combinations of these two can be applied. In case a dry fractionation is performed, we prefer to perform a multi-step dry fractionation as disclosed in our European Patent application 399 597.

Depending on the type of starting material the fractionation can be a two-step of a multi-step fractionation process.

The best results are obtained, when we apply a two-step wet fractionation process.

In a two-step process, starting from palm oil stearin the following steps can be applied:

1. wet fractionation with an organic solvent, such as hexane, petr. ether and in particular acetone, at −5° to 5° C., yielding a stearin fraction, preferably in yields of 45–85 wt %, more preferably 45–75 wt % based on the palm oil stearin. This fraction predominantly consists of SSS, SUS and SSU triglycerides.
2. The stearin fraction of 1) is subjected to a second wet fractionation with an organic solvent (again hexane, petr. ether or acetone) at 15°–25° C. This time the olein (or bottom) fraction is collected as the product enriched in SSU (at least 12 wt %). This olein fraction is separated in a yield of 25–80 wt %, preferably 35–80 wt %, based on the stearin fraction of step 1).

An alternative route, however, is to perform the first wet fractionation at 15°–25° C., collecting the olein fraction, consisting predominantly of UUU; SUU; SSU and SUS triglycerides. Subjecting this olein fraction to a second wet fractionation at −5° to 5° C. and collecting the stearin fraction as product fraction.

In this case the olein fraction is separated in the first step in a yield of 45–90 wt %, preferably 55–85 wt %, while the stearin fraction in the second stage is separated in a yield of 25–80 wt %, preferably 40–50 wt %.

In the wet fractionation amounts of 1–8, preferably 3–7 l solvent per kg triglyceride material are used The exact amount will vary with the type of solvent and with the fractionation temperature applied.

Working within the process parameter set out above will in general result in a product with at least 12 wt % SSU, whereas the ratio between the weight content SSU in the product and the weight content of SSU in starting material is at least 1.5. Simultaneously, its SUS content will be more than 65 wt %.

Although wet fractionation steps are disclosed in detail above, dry fractionation steps, in particular as a multi-step process, can also be applied.

The products resulting from the process are very suitable for application in the fat part of fillings or coatings of confectionery products, such as chocolate bars or bonbons. The use of these compounds will impart cool melting and non-temper properties to the filling or coating compositions of the confectionery product.

EXAMPLE

Four different triglyceride compositions A, B, C and D with the composition mentined in table I were subjected to a double wet fractionation.

The conditions for the wet fractionations are given in table II. The olein fractions of step 2 were collected. Their SSU content is given in table III.

TABLE 1

|   | SSS  | SOS  | SSO | SLns | SSLn | SOO  | OSO | SOLn | OOO | >3DB |
|---|------|------|-----|------|------|------|-----|------|-----|------|
| A | 27.8 | 30.5 | 7.1 | 6.0  | 1.2  | 15.0 | 1.7 | 5.7  | 2.0 | 2.7  |
| B | 17.3 | 32.5 | 5.9 | 7.4  | 1.4  | 20.9 | 0.9 | 7.8  | 2.6 | 3.2  |
| C | 11.0 | 33.7 | 5.2 | 8.2  | 1.5  | 24.4 | 0.3 | 9.1  | 2.9 | 3.4  |
| D | 6.8  | 34.5 | 4.7 | 8.8  | 1.6  | 26.8 | 0.0 | 9.9  | 3.1 | 3.6  |

S = saturated $C_{16}/C_{18}$
O = oleic
Ln = linoleic
DB = double bonds

TABLE II

|        | solvent | 1 solv/kg TG | fract T | prod. fr. | yield pr. fr.* |
|--------|---------|--------------|---------|-----------|----------------|
| step 1 | acetone | 6.0          | 0° C.   | stearin   | 45%            |
| step 2 | acetone | 6.0          | 20° C.  | olein     | 35%            |

*based on starting material

TABLE III

| Fat | SSU in start. fat | % SSU in end product |
|-----|-------------------|----------------------|
| A   | 8.3               | 14.3                 |
| B   | 7.3               | 12.4                 |
| C   | 7.7               | 13.2                 |
| D   | 6.3               | 10.8                 |

It will be evident from the above results that although starting material D meets the requirement of SSU content, the product obtained from this material D is too low in SSU. This means that other yields or temperatures must be applied for this fat, when one wants to cope with the SSU content of the end product.

Comparative Example

Example 1 of EP 81 881 was carried out, starting from a palm oil stearin with the following triglyceride composition:

$S_3$:30.3 wt % SLnS: 6.6 wt %
SOS: 29.1 SSLn: 1.8
SSO: 7.3 SOO: 13.9
OSO: 1.3 wt %
SOLn: 5.4
$O_3$:2.0

The conditions, mentioned in EP 81 881 were used. A product enriched in SSU was obtained. This product had the following composition:

$S_3$:1.9 wt % SLnS: 7.9 wt %
SOS: 58.9 SSLn: 1.4
SSO: 11.5 SOO: 10.4
OSO: 1.0 wt %
SOLn: 3.6
$O_3$:1.5

So, in this process we could not achieve an enrichment in the SSU-component of more than 1.5 (found: 1.41). Moreover, the SUS content of this fraction was rather low (66.8 wt %).

We claim:

1. A process for preparing a fat fraction, suitable as fat component in non-lauric, non-hydrogenated, cool-melting, non-temper, non-trans filling or coating fats comprising fractionating in two steps, wherein both steps comprise wet fractionation, a triglyceride composition, containing at least 5 wt % SSU triglycerides wherein S=saturated fatty acid $C_{16}$–$C_{22}$ and U=mono- or poly-unsaturated fatty acids $C_{18}$–$C_{22}$, removing at least part of the trisaturated triglycerides, or at least part of di- and tri-unsaturated triglycerides or at least part of both, and isolating a triglyceride composition with an SSU content 12–20 wt %, which content is at least 1.7 times the SSU content of the starting triglyceride composition.

2. Process according to claim 1, wherein the SSU content of the starting triglyceride composition is at least 6 wt %.

3. Process according to claim 1, wherein the SUS content, S and U being identical with S and U of claim 1, of product isolated is at least 65 wt %.

4. Process according to claim 1, wherein the starting triglyceride composition is a stearin fraction obtained after dry fractionation of palm oil.

5. Process according to claim 4, wherein the palm oil stearin is fractionated in two steps.

6. A two-step fractionation process for the production of a fat fraction, suitable as a fat component in non-lauric, non-hydrogenated, cool-melting, non-temper, non-trans filling or coating fats which comprises the steps of (1) subjecting a feed triglyceride composition containing at least 5 wt % SSU triglycerides, wherein S=$C_{16}$–$C_{22}$ saturated fatty acids and U=mono- or poly-unsaturated $C_{18}$–$C_{22}$ fatty acids to wet fractionation with an organic solvent at −5° to 50° C. and separating a fraction consisting essentially of SSS, SUS and SSU triglycerides in a yield of 45–85 wt % based on the feed triglyceride composition, and (2) subjecting the fraction separated in step (1) to wet fractionation with an organic solvent at 15°–25° C. and recovering in a yield of 25–80 wt % based on the fraction separated in step (1), as the fat fraction, a product triglyceride composition having a SSU content of 12–20 wt %, which content is at least 1.7 times the SSU content of the feed triglyceride composition in step (1).

7. A process according to claim 6 wherein the feed triglyceride composition in step (1) is palm oil stearin, a stearin fraction is separated in step (1) and fractionated in step (2), and an olein fraction is recovered as the product triglyceride composition enriched in SSU.

8. A two-step fractionation process for the production of a fat fraction, suitable as a fat component in non-lauric, non-hydrogenated, cool-melting, non-temper, non-trans filling or coating fats which comprises the steps of (1) subjecting a feed triglyceride composition containing at least 5 wt % SSU triglycerides, wherein S=$C_{16}$–$C_{22}$ saturated fatty acids and U=mono- or poly-unsaturated $C_{18}$–$C_{22}$ fatty acids to wet fractionation with an organic solvent at 15°–25° C. and separating a fraction consisting essentially of $U_3$, SUU, SSU and SUS triglycerides in a yield of 45–90 wt % based on the feed triglyceride composition, and (2) subjecting the fraction separated in step (1) to wet fractionation with an organic solvent at −5° to 5° C. and recovering in a yield of 25–80 wt % based on the fraction separated in step (1), as the fat fraction, a product triglyceride composition having a SSU content of 12–20 wt %, which content is at least 1.7 times the SSU content of the feed triglyceride composition in step (1).

9. A process according to claim 7 wherein the feed triglyceride composition in step (1) is a palm oil stearin, an olein fraction is separated in step (1) and fractionated in step (2), and a stearin fraction is recovered as the product triglyceride composition enriched in SSU.

10. Process according to claims 6 or 8, wherein the wet fractionations are carried out, using hexane, or petroleum ether or acetone as solvent in amounts of 1–8 l per kg triglyceride.

* * * * *